United States Patent
Cammons et al.

(10) Patent No.: US 6,192,169 B1
(45) Date of Patent: Feb. 20, 2001

(54) ENCLOSURE FOR OPTICAL INTEGRATED CIRCUIT

(75) Inventors: Ray R. Cammons, Woodstock; George F. DeVeau, Cumming, both of GA (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/322,794

(22) Filed: May 28, 1999

(51) Int. Cl.$^7$ ........................................................ G02B 6/12
(52) U.S. Cl. ........................................ 385/14; 385/12
(58) Field of Search ............................... 385/14, 12

(56) References Cited

U.S. PATENT DOCUMENTS

| | | | |
|---|---|---|---|
| Re. 34,179 | 2/1993 | Eccleston | 307/310 |
| 3,694,626 | 9/1972 | Harden, Jr. | 219/541 |
| 4,251,714 | 2/1981 | Zobele | 219/275 |
| 4,307,289 | 12/1981 | Thomas et al. | 219/521 |
| 4,369,355 | 1/1983 | Helixon | 219/521 |
| 4,388,521 | 6/1983 | Thomas et al. | 219/521 |
| 4,414,576 | 11/1983 | Randmae | 358/229 |
| 4,460,820 | 7/1984 | Matsumoto et al. | 219/385 |
| 4,672,180 | 6/1987 | Kusunoki et al. | 219/494 |
| 4,684,783 | 8/1987 | Gore | 219/210 |
| 4,833,681 | 5/1989 | Akiyama et al. | |
| 4,873,424 | 10/1989 | Ryder et al. | 219/521 |
| 4,968,121 | 11/1990 | Bruesselbach et al. | 350/354 |
| 5,136,671 | 8/1992 | Dragone | 385/46 |
| 5,235,159 | 8/1993 | Kornrumpf et al. | 219/486 |
| 5,559,915 | 9/1996 | DeVeau | 385/49 |
| 5,587,096 | 12/1996 | Huvard et al. | 219/521 |

OTHER PUBLICATIONS

Motorola Semiconductor Technical Data, Motorola, Inc., 1996.

Primary Examiner—Robert Kim

(57) ABSTRACT

A preferred embodiment incorporates base and cap members that are matable to each other to form, in a mated configuration, a cavity therebetween, that is sized and shaped to receive an optical integrated circuit therein. The base member includes a first latch post, with a first latching surface arranged between its proximal end and its distal end. The cap member includes a second latch post, with a second latching surface and an area of failure arranged between its proximal end and its distal end. The latching surfaces are arranged so that, as the base and cap members are urged toward the mated configuration, the latching surfaces retain the members in the mated configuration. Additionally, the second latch post is configured so that, as the members are urged apart, the second latch post structurally fails at the area of failure, thereby allowing the cap member to be removed from the base member. A replacement cap member then can be mated with the base member without disturbing the components mounted to the base member.

15 Claims, 4 Drawing Sheets

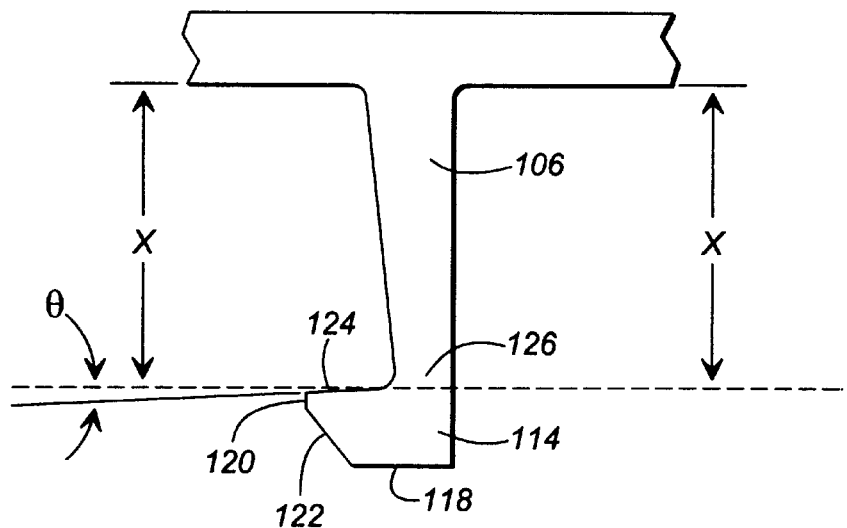
FIG. 3
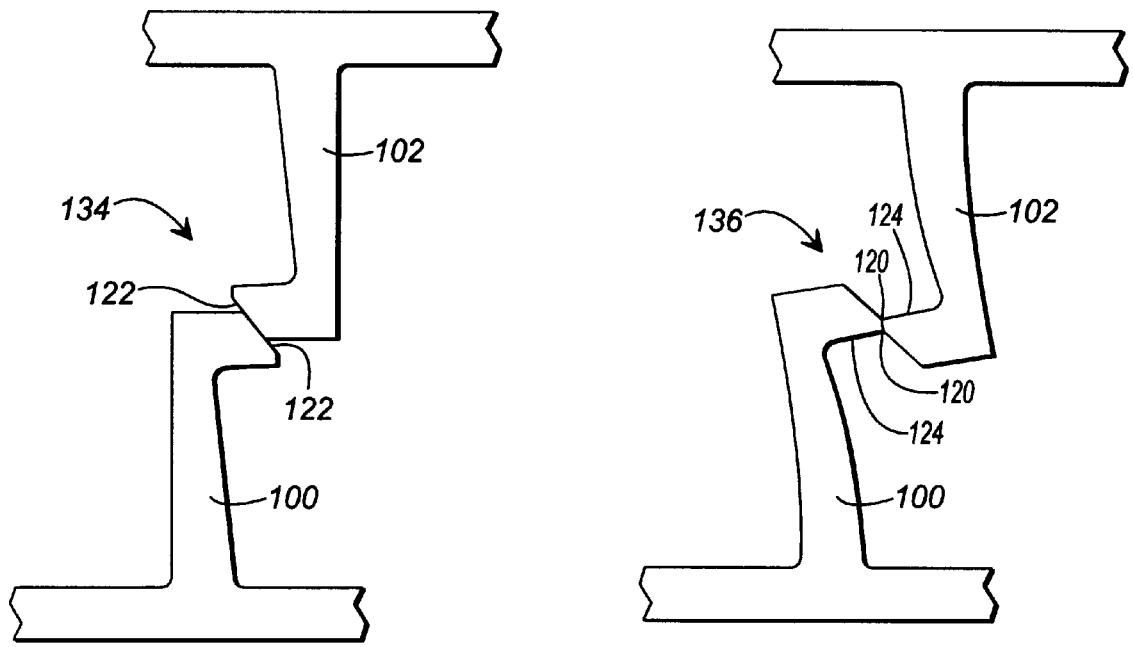
FIG. 4  FIG. 5

ENCLOSURE FOR OPTICAL INTEGRATED CIRCUIT

CROSS-REFERENCE TO RELATED APPLICATIONS

Reference is made to U.S. patent applications Ser. Nos. 08/994,266, filed on Dec. 19, 1997 now U.S. Pat. No. 5,994,679, and (Brewer 4-22-3/60103-1470), filed on May 28, 1999.

BACKGROUND OF THE INVENTION

1. Field of the Invention

The present invention generally is related to the field of optical integrated circuits and, in particular, to enclosures for housing optical integrated circuits.

2. Description of the Related Art

Communication systems utilizing optical signals encounter problems that are unique to light wave signal manipulation. These problems generally are not present in communication systems utilizing lower frequency signals, such as those systems which include conductive wires for the transmission of the lower frequency signals. For example, optical switching, multiplexing, and demultiplexing are all operations that present problems. Heretofore, such operations typically have required numerous discrete optical components and, as a result, the systems incorporating these components suffer from increased bulkiness and reduced reliability. As a consequence, much effort has been directed at reducing the number of system components by combining their operations on a single, monolithic chip which generally comprises a thin film, compact planar optical circuit.

One example of such a monolithic device is a dense wave division multiplexer (DWDM) of the type shown, for example, in U.S. Pat. No. 5,136,671, issued to Dragone, the disclosure of which is herein incorporated by reference. Such a device is useful where a large number of transmission channels must be crowded into a narrow bandwidth window. Such narrow windows can result, for example, from the use of erbium doped optical amplifiers, which are widely used today, but which can severely limit the usable bandwidth. In order to accommodate many channels in the narrow window, the channels must be closely spaced in wavelength, such as, for example, successive wavelengths differing by 0.8 nm or 1.6 nm.

By use of OASIC (optical application specific integrated circuits) technology, thin film planar optical circuits can be formed to produce such a DWDM as discussed, on a single wafer or chip. Such a chip generally comprises a thin silicon wafer upon which a low refractive index silica glass lower cladding is deposited. A high index core layer is then deposited, patterned, and etched to form the optical waveguides, and then an upper cladding is deposited. Wafers for a variety of functions can be produced using the OASIC technology; however, the remainder of the discussion will be directed to the DWDM in the interest of simplicity and consistency. It should be understood that these other types of integrated circuits are by no means intended to be excluded.

One of the problems arising from the use of some OASIC devices, particularly the arrayed waveguide gratings in a DWDM, is their sensitivity to temperature changes, and to physical stresses which impair their reliability. For example, in the DWDM, because the operating wavelengths of the several individual channels differ by such a small degree, any expansion, contraction or bending due to temperature fluctuations, i.e. temperature fluctuations less than 1° C., for instance, may degrade the optical performance and, in extreme cases, can cause circuit failure.

It has been found that degradation or failure can generally be prevented and reliability of the circuit improved if the temperature of the device is maintained at a predetermined temperature in a range of 75° C. to 90° C. This maintenance temperature, specific to the individual circuit, must be controlled to within a few degrees Celsius even though the ambient temperature may vary from, for example, 0° C. to 70° C. Thus, some sort of protective housing must be provided for the wafer, i.e. circuit, to maintain it within the desired temperature range.

Maintaining various types of electronic devices at an even temperature by housing them in sealed containers is well known in the prior art. Typically, these enclosures, such as those configured for housing an OASIC chip or dye, are injected molded and include an upper half and a lower half, with the halves being engagable to form the enclosure. An OASIC chip typically is mounted on the lower half of the enclosure with various housed components, such as fibers, heating elements, and electrical pin-outs. The upper half is then position and fastened thereto so as to form an assembled package. After assembly, the enclosure and its internally housed components must be optically tested, both before and after thermal shock tests, in order to detect potentially unreliable devices and to determine if additional components, such as resistors, must be added to the package in order that the package can meet the desired performance criteria.

In order for the aforementioned testing to yield characteristic optical performance results, the assembled OASIC package must be sealed with all its internal components in place. However, if the sealed package does not pass the tests, as well as meet the required performance criteria, the package must be reentered for rework. Since the assembled packages typically are sealed together by epoxy, reentering an assembled package for rework typically destroys the enclosure, thereby necessitating the remounting of the internal components within the lower half of a substitute enclosure.

In an effort to alleviate the need of providing substitute enclosures due to the destruction of the enclosures during reentry, a temporary sealing tape oftentimes is applied to the joint formed between upper and lower halves of the enclosures to allow for testing of the temporarily sealed package. However, even if the temporarily sealed package passes testing and meets the desired performance criteria, the temporarily sealed package must receive a final sealing, which typically includes sending the package to a sealing section of the assembly line, where the sealing tape is removed from the enclosure and the enclosure is sealed with epoxy.

Mechanical fasteners, such as screws, also have been used to fasten the upper and lower halves of the enclosures together. These fasteners allow the upper and lower halves to be separated prior to a rework process without destroying the enclosure; however, the additional assembly time required to carry out these steps can result in production inefficiencies. Furthermore, once the upper and lower halves of the enclosure are reassembled after the rework process, the screws typically are epoxied in position so that the manufacturer can detect when a customer has entered the enclosure, thus voiding most warranties associated with the assembled packages. Typically, the use of mechanical fasteners also includes sending the package to a sealing section of the assembly line for applying epoxy, as described hereinbefore.

Therefore, there is a need to provide improved enclosures for housing circuits that address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to housings for optical integrated circuits, such as a DWDMs. In a preferred embodiment, the housing incorporates a base member and a cap member that are matable to each other to form, in a mated configuration, a cavity therebetween, with the cavity being sized and shaped to receive an optical integrated circuit therein. The base member includes a first latch post formed of resilient material having a proximal end affixed to the base member, a distal end, and a first latching surface arranged between its proximal end and its distal end. The cap member includes a second latch post formed of resilient material, with the second latch post having a proximal end affixed to the cap member, a distal end, a second latching surface arranged between its proximal end and its distal end, and an area of failure preferably arranged between its proximal end and its distal end. The latching surfaces are arranged so that, as the cap member and the base member are urged toward the mated configuration, the latching surfaces engage each other in an interlocking relationship and retain the cap member and the base member in the mated configuration. Additionally, the second latch post is configured so that, as the cap member and the base member are urged apart from the mated configuration, the second latch post structurally fails such that the latching surfaces disengage from each other and the cap member is removable from the base member.

Since the first latch posts of the base member preferably remain intact, repackaging of an optical integrated circuit, which is arranged within the base member, is facilitated by providing a replacement cap member. Thus, repackaging of the optical integrated circuit and its associated components does not require remounting the circuit and the components within a replacement base member.

In accordance with an aspect of the present invention, a preferred embodiment incorporates a slot formed between an upper edge of the base member and a lower edge of the cap member, with the slot being sized and shaped for receiving the head of a screwdriver, or other suitable device. So configured, as the head of the screwdriver is inserted within the slot and the screwdriver is rotated, the head of the screwdriver urges the cap member and the base member to separate from the mated configuration, thereby causing the second latch post to fail structurally at the area of failure.

In accordance with another aspect of the present invention, a preferred embodiment is provided in the form of an assembled circuit package incorporating a housing and an optical integrated circuit disposed between the base member and the cap member of the housing. Preferably, the assembled circuit package includes a thermal bed supported within the base member, thermally conductive means for holding the optical integrated circuit, and heater means for heating the thermal bed.

A method aspect of the present invention includes the steps of: (1) providing a housing having a base member and a cap member, with the cap member being matable with the base member to form, in a mated configuration, a cavity therebetween, with the base member including a first latching surface formed thereon, and the cap member including a second latching surface formed thereon; (2) housing an optical integrated circuit within the cavity; (3) securing the base member and the cap member in the mating configuration by engaging the first and second latching surfaces with each other; (4) separating the cap member from the base member by causing structural failure of a portion of the base member, thereby disengaging the first latching surface from the second latching surface, and; (5) providing a replacement cap member and securing the replacement cap member to the base member in the mating configuration.

The numerous features and advantages of the present invention will be more readily apparent from the following detailed description, read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings:

FIG. 3 is a partially cut-away, side view of a preferred embodiment of the latch post of the present invention showing detail of the latching surface.

FIG. 4 is a partially cut-away, side view of a pair of latch posts oriented in the engaged position.

FIG. 5 is a partially cut-away, side view of a pair of latch posts oriented in the cocked position.

DETAILED DESCRIPTION OF THE PREFERRED EMBODIMENT

Figure 1:
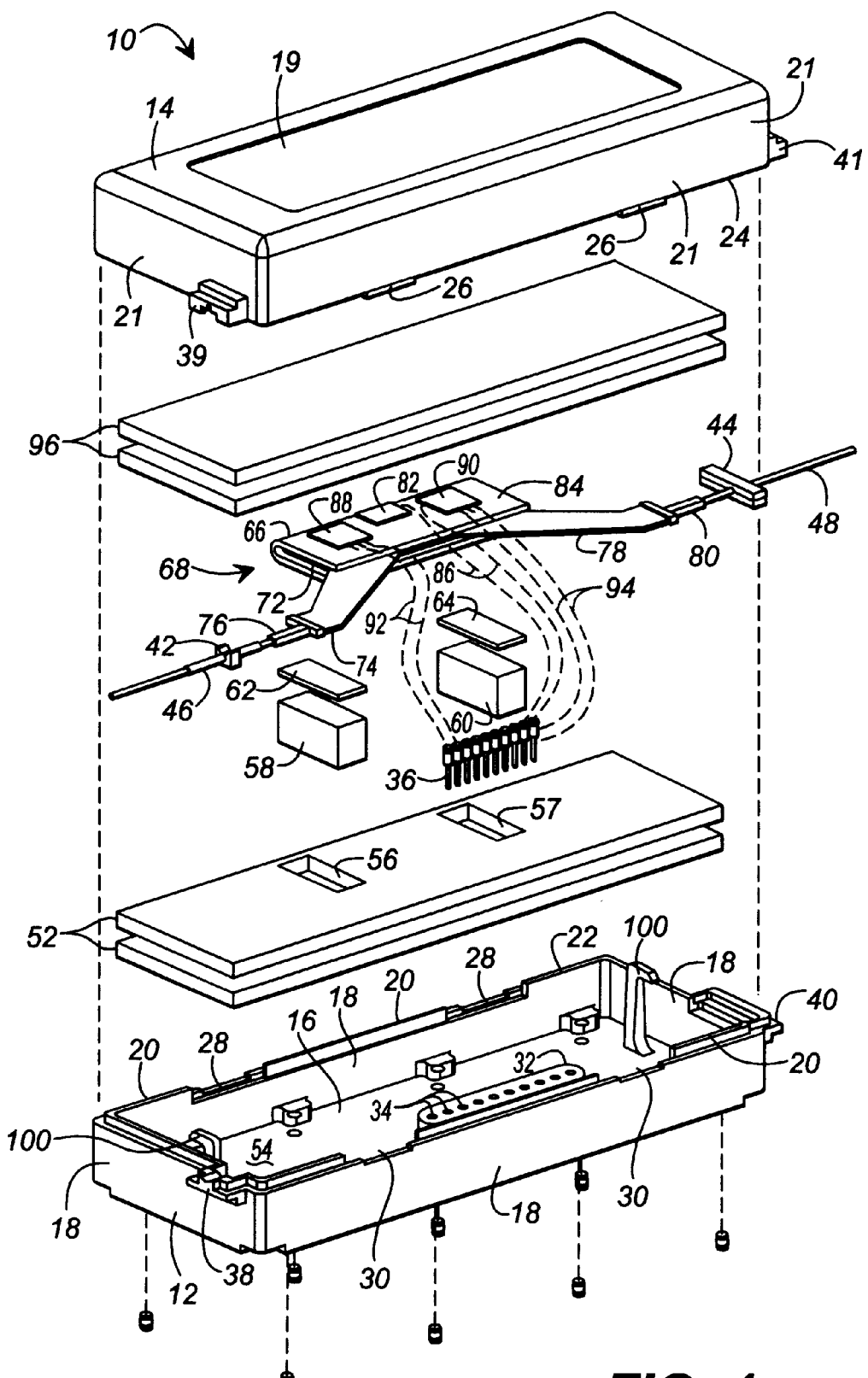
FIG. 1 is an exploded perspective view of the housing of the present invention containing representative OASIC components therein.
Figure 2:
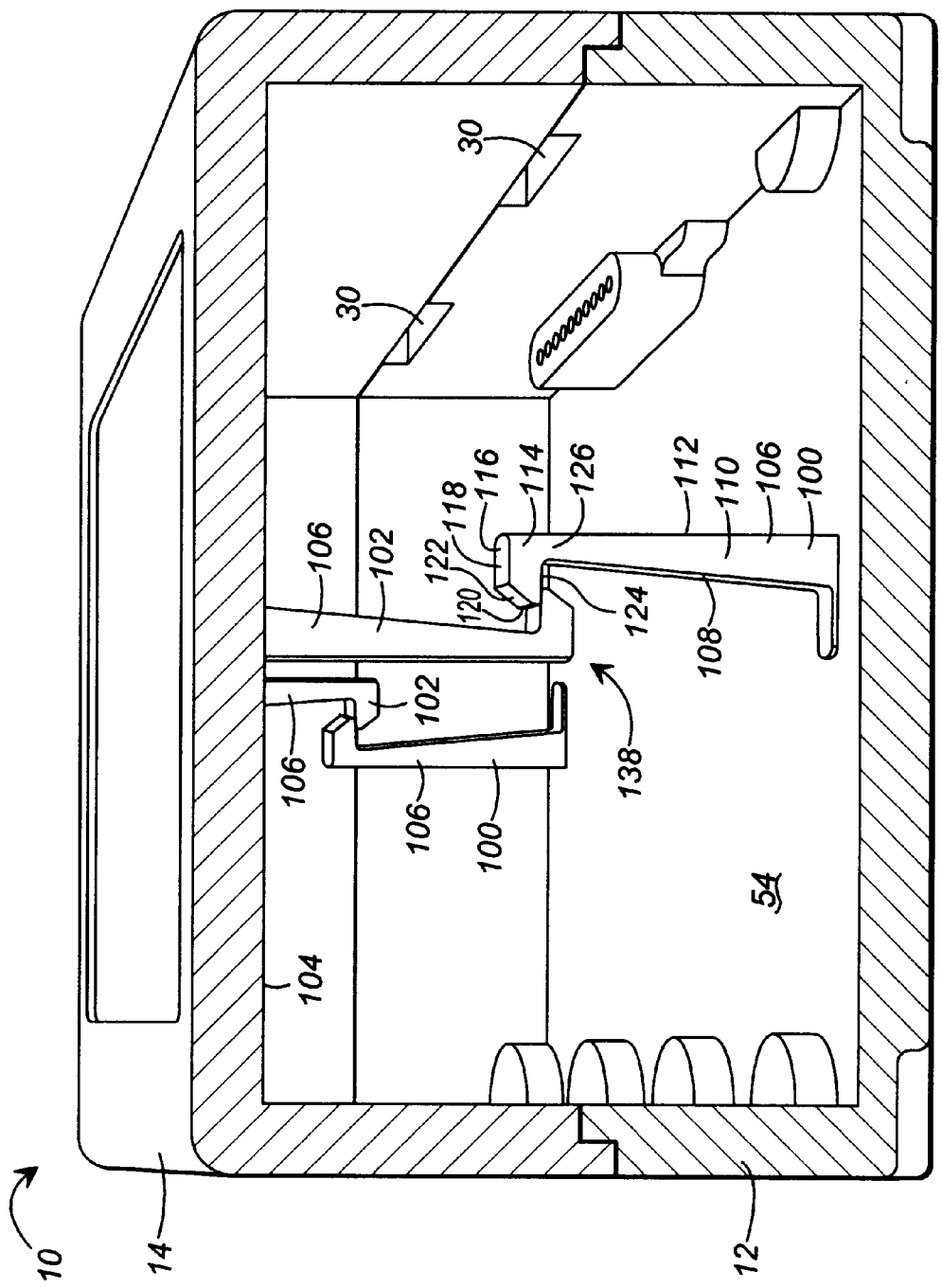
FIG. 2 is a partially cross-sectional, perspective side view of the housing shown in an assembled configuration with the internal components removed for clarity.
Figure 6:
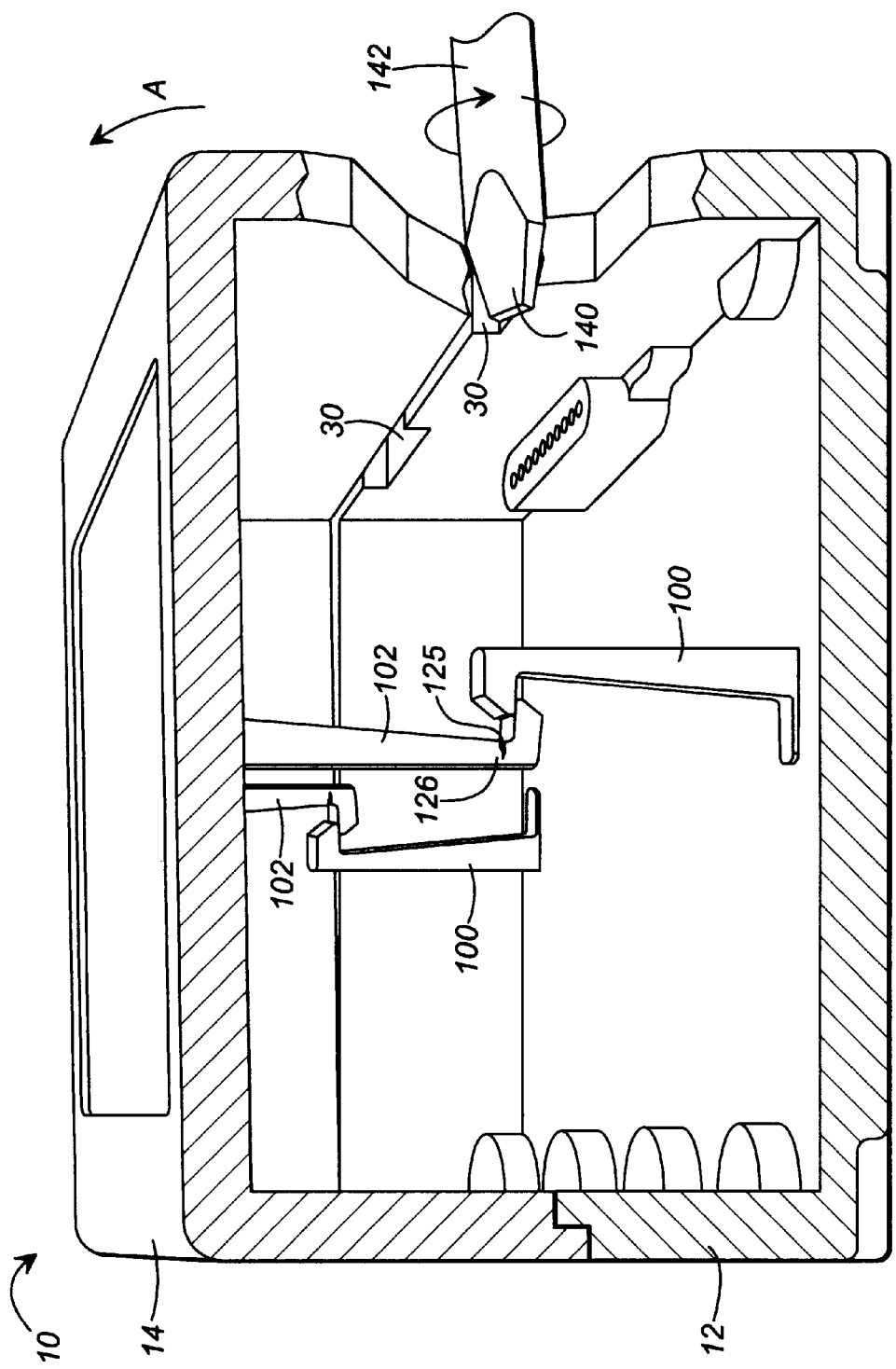
FIG. 6 is a partially cut-away, perspective side view of the embodiment of the housing shown in FIG. 2, showing detail of the controlled break-away feature of a latch post during reentry of the housing.

Reference will now be made in detail to the description of the invention as illustrated in the drawings, wherein like reference numbers indicate like parts throughout the several views. As shown in FIG. 1, a preferred embodiment of the housing 10 incorporates a base member 12 and a cap member 14. Base member 12 and a cap member 14 preferably are formed of a polyphenylene sulfide (PPS), such as Fortron manufactured by Ticona, which is selected due to its low coefficient of thermal expansion and desirable high temperature characteristics, although other suitable materials can be used. Base member 12 has a bottom wall 16 and side walls 18 extending therefrom, and rib segments 20 which extend around the inner periphery of the upper edge 22 of the side walls 18. The cap member 14 has a top wall 19 and side walls 21 extending therefrom, with the lower edge 24 of side walls 21 being adapted to engage the rib segments 20 of the base member 12. Additionally, cap member 14 has projecting members 26 which are configured to engage gaps 28 formed between adjacent rib segments 20 of the base 12. This arrangement of rib segments, projecting members, and gaps allows cap member 14 to be snapped onto base member 12, where it is held firmly in place, thereby forming a cavity 29 therebetween that is sized and shaped for the placement of components. As described in greater detail hereinafter, base member 12 also includes disassembly slots 30 formed along the outer periphery of the upper edge 22 of the side walls 18, as well as opposing latch posts 100 and 102 (FIG. 2) that cooperate to promote secure attachment of the cap member 14 to the base member 12.

As described hereinbefore, the housing 10, which is similar to that shown in U.S. patent application Ser. Nuo. 08/994,266, filed on Dec. 19, 1997, preferably is configured to encase an OASIC chip and various associated components. A representative assembly of such components is described hereinafter (depicted in FIG. 1) and serves to illustrate a preferred embodiment of an assembled OASIC package 50; however, numerous other configurations and arrangements of components are considered within the scope of the present invention.

In the embodiment depicted in FIG. 1, base member 12 has, within its interior, a pedestal member 32 having apertures 34 therein for receiving and holding contact pin members 36 which project through base member 12 to the exterior of the housing 10. Preferably, base member 12 has a pair of channeled aperture members 38 and 39 that are configured to receive a fiber collar 42, and cap member 14 has a pair of channeled aperture members 40 and 41 that are configured to receive a ribbon collar 44. In assembly, collars 42 and 44 are affixed to fiber 46 and ribbon 48, respectively, and wedged into the channels of apertures 38 and 39, and 40 and 41, respectively, when cap member 14 and base member 12 are snapped together.

As shown in FIG. 1, one or two layers 52 of thermal insulation, such as polyimide fibrous material, are carried with base member 12 and rest on the floor 54 thereof. The thermal insulation layer 52 has first and second cutouts 56 and 57 for receiving first and second support members 58 and 60, respectively, which can be a hardened polyimide, for instance. On top of each support member 58 and 60 is a double-sided tape member 62 and 64, respectively, which is used to hold in place a thermal bed 66. Thermal bed 66 comprises a U-shaped member of suitable thermally conductive material, such as aluminum, defining a slot 68 which contains a thermally conductive grease (not shown). The grease should be selected such that it maintains its properties over broad environmental and temperature ranges, and should be resistant to moisture, humidity, ozone, radiation and many chemicals. Preferably, the grease is a highly thermally conductive, silver-filled silicone grease (such a material is commercially available as Norsil 56840-EC, produced by Norlabs Co).

Carried within the slot 68 is, for example, an OASIC circuit die 72 for a DWDM. While thermal bed 66 is shown as U-shaped, other shapes and/or configurations can be used, so long as it is capable of substantially covering circuit 72, and is capable of retaining the grease within the slot. One leg 74 of circuit 72 is connected to fiber 46 by a connector 76 and the other leg 78 is connected to ribbon 48 by a connector 80. Connectors 76 and 80 preferably are of the type shown and described in U.S. Pat. No. 5,559,915, issued to Deveau, and the connections made using the techniques shown and described in that patent.

A heater element 82, preferably of the resistive type, is affixed to the top surface 84 of thermal bed 66 and is connected to pin members 36 by leads 86, shown in dashed lines. Also affixed to surface 84 are first and second resistance temperature devices 88 and 90, that are connected to the pin members 36 by leads 92 and 94, respectively, shown in dashed lines. Overlying the thermal bed 66 and the associated components is a thermal insulating blanket 96 which fits into the interior of cap member 14.

As mentioned hereinbefore (shown in detail in FIGS. 2–6), housing 10 includes opposing latch posts 100 and 102, with posts 100 being affixed to the floor 54 of base member 12 and posts 102 being affixed to the ceiling 104 of cap member 14. Each post incorporates a leg 106, which preferably is formed as an integrally molded portion of its respective base or cap member, with each leg preferably including a flat front wall 108 and a side wall 110 that extends from the front wall to form a rounded surface extending along the back edge 112 of the post. A clasp or foot 114 is arranged at the distal end 116 of each leg 106 and preferably includes an end wall 118, a toe 120, and an inclined wall 122 interconnecting the end wall 118 and the toe 120. Additionally, a latching surface 124 extends inwardly from the toe 120 and merges with the leg 106 at an ankle portion 126 thereof. Preferably, the latching surface 124 forms an angle ($\theta$) of between approximately 1.5 degrees and approximately 4 degrees, preferably approximately 2 degrees, with the floor 54 or ceiling 104 to which it is affixed, with the latching surface 124 being inclined outwardly and away from the surface to which it is affixed.

Each latch post 102 also incorporates a weakened area or area of failure 125 (FIG. 6), preferably formed as a necked portion of the post in the vicinity of its ankle portion 126, for instance, thereby providing a preselected area of the post that is designed to fail structurally when the foot 114 is placed under sufficient tension. Other means for providing the area of failure 125 also can be utilized, such as notches in the material of the post, among others, so that, when placed under sufficient tension, post 102 fails structurally prior to its opposing post 100.

So configured, as the cap member 14 is aligned over and then is urged toward its base member 12 during assembly, the inclined walls 122 of the latch posts 100 and 102 engage in an engaged position 134 (FIG. 4). Engagement of the inclined walls 122 and continued movement of the cap member 14 toward the base member 12 urges the legs 106 of the posts 100 and 102 away from each other until the toes 120 of the posts abut each other in a cocked position 136 (FIG. 5). Further movement of the cap member 14 toward the base member 12 urges the toe 120 of post 100 to pass beyond the toe 120 of post 102, thereby allowing the latching surfaces 124 of the posts 100 and 102 to engage each other in an interlocking relationship in a locked position 138 (FIG. 2), with the base member 12 and the cap member 14 being retained by the posts in a mated configuration.

The angled configuration of the latching surfaces 124 allows the posts 100 and 102 to engage each other even though the posts are not configured with a conventional degree of over-travel between the latching surfaces, e.g. during assembly, when base member 12 and cap member 14 are moved to the mated configuration, the respective feet 114 of the opposing posts do not pass beyond each other (over-travel), thereby disengaging the latching surfaces 124 from each other. Additionally, the angled configuration of the latching surfaces 124 provides self-tightening of the cap member 14 to the base member 12 as the resilience of each leg 106 urges its toe 120 toward the ankle portion 126 of the opposing post. So configured, as the posts attempt to return to their unbiased positions, the cap member and base member are drawn closer together as the latching surfaces 124 slide against each other. Thus, the base member 12 and cap member 14 are able to maintain a tight, interlocking fit even during thermal cycling of the housing 10.

After assembly, the housing 10 and its internal components are tested to ensure that desired optical performance characteristics of the assembled OASIC package 50 are achieved. If it is determined that the desired characteristics are not present, typically, it is necessary to reenter the housing 10. Reentry of the housing 10 is facilitated by disassembly slots 30 which are sized and shaped for receiving the head 140 (FIG. 6) of a screwdriver 142, or other similar device. After inserting the head 140 of the screwdriver 142 into one of the slots 30, the screwdriver is rotated, thereby prying apart the cap member 14 from the base member 12, i.e. in direction A.

As the base and cap members separate, tensile forces are transferred through the base and cap members to the latch posts 100 and 102, causing the latching surfaces 124 of the latch posts to bear against each other with an ever increasing force. In response to this force, the weakened area of failure 125 of the latch 102 causes structural failure of the latch 102 in the vicinity of its ankle portion 126, thereby disengaging the cap member 14 from the base member 12 and allowing for reentry of the package 50. Once the necessary modifications to the package 50 have been completed, a new cap member 14 is installed onto the base member 12 in the aforementioned manner. Thus, reentry of the housing 10 is facilitated without disturbing the components mounted to the base member 12. This is accomplished while inhibiting the ability of end users to enter the housing, tamper with the housed components, and then reseal the housing in a manner which escapes detection. Typically, this can occur with housings of the prior art when an end user reseals the housing in an undetectable manner, such as by reapplying epoxy to the housing, for instance.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. In particular, the housing of the present invention constitutes a means of protecting various types of circuits and other components. Various modifications or adaptations of the principles of the invention to specific specialized uses may be made which, while perhaps involving different physical configurations, do not depart from those principles as disclosed in the foregoing. All such modifications and variations, are within the scope of the invention as determined by the appended claims when interpreted in accordance with the breadth to which they are fairly and legally entitled.

What is claimed is:

1. An enclosure for an optical integrated circuit comprising:
    a base member having a bottom wall, side walls, and a first latch post, said side walls extending from said bottom wall, said first latch post formed of resilient material and having a proximal end, a distal end, and a first latching surface arranged between said proximal end and said distal end, said proximal end affixed to said bottom wall, and;
    a cap member having a top wall, side walls, and a second latch post, said side walls extending from said top wall, said second latch post formed of resilient material and having a proximal end, a distal end, a second latching surface arranged between said proximal end of said second latch post and said distal end of said second latch post, and an area of failure located between said proximal end of said second latch post and said distal end of said second latch post, said proximal end of said second latch post affixed to said cap member, said cap member being matable with said base member to form, in a mated configuration, a cavity therebetween, said cavity being sized and shaped to receive the optical integrated circuit therein,
    said latching surfaces being arranged such that as said cap member and said base member are urged toward said mated configuration, said latching surfaces engage each other in an interlocking relationship and retain said cap member and said base member in said mated configuration,
    said second latch post being configured such that, as said cap member and said base member are urged apart from said mated configuration, said second latch post structurally fails at said area of failure such that said latching surfaces disengage from each other and said cap member is removable from said base member.

2. The enclosure of claim 1, wherein said first latch post has a first leg and a first inclined wall, said first leg extending between said proximal end and said distal end of said first latch post, said first inclined wall extending from said distal end of said first latch post downwardly toward said bottom wall and outwardly away from said first leg, and
    wherein said second latch post has a second leg and a second inclined wall, said second leg extending between said proximal end and said distal end of said second latch post, said second inclined wall extending from said distal end of said second latch post upwardly toward said top wall and outwardly away from said second leg,
    said first and second inclined walls being arranged such that, as said cap member and said base member are urged toward said mated configuration, said first and second inclined walls engage each other and urge said latching surfaces toward engagement in said interlocking relationship.

3. The enclosure of claim 1, wherein said first latching surface is spaced from and inclined relative to said bottom wall such that as said cap member and said base member are urged toward said mated configuration and said latching surfaces engage each other in said interlocking relationship, movement of said distal end of said first latch post toward said second latch post urges said cap member toward said base member.

4. The enclosure of claim 1, wherein said base member has a plurality of said first latch posts affixed thereto and said cap member has a plurality of said second latch posts affixed thereto.

5. The enclosure of claim 1, wherein at least a portion of said first latching surface extends above an upper edge of said side walls of said base member.

6. The enclosure of claim 1, wherein at least a portion of said second latching surface extends below a lower edge of said side walls of said cap member.

7. The enclosure of claim 1, wherein said area of failure forms a necked portion of said second latch post.

8. The enclosure of claim 1, wherein said enclosure has a slot formed between an upper edge of said side walls of said base member and a lower edge of said side walls of said cap member, said slot being sized and shaped for receiving the head of a screwdriver such that inserting the head of the screwdriver within the slot and then rotating the screwdriver urges said cap member and said base member to separate from said mated configuration.

9. The enclosure of claim 3, wherein said second latching surface is spaced from and inclined relative to said top wall.

10. The enclosure of claim 3, wherein said first latching post has a first arm extending between said proximal end and said distal end of said first latching post, said first latching surface extending outwardly from said first arm.

11. The enclosure of claim 3, wherein said first latching surface forms an angle relative to said bottom wall of between approximately 1.5 degrees and approximately 4 degrees.

12. An assembled circuit package comprising:

a housing having a base member and a cap member, said base member having a bottom wall, side walls, and a first latch post, said side walls extending from said bottom wall, said first latch post formed of resilient material and having a proximal end, a distal end, and a first latching surface arranged between said proximal end and said distal end, said proximal end affixed to said bottom wall, and;

said cap member having a top wall, side walls, and a second latch post, said side walls extending from said top wall, said second latch post formed of resilient material and having a proximal end, a distal end, a second latching surface arranged between said proximal end of said second latch post and said distal end of said second latch post, and an area of failure located between said proximal end of said second latch post and said distal end of said second latch post, said proximal end of said second latch post affixed to said cap member, said cap member being matable with said base member to form, in a mated configuration, a cavity therebetween, and;

an optical integrated circuit disposed between said base member and said cap member within said cavity, said latching surfaces being arranged such that as said cap member and said base member are urged toward said mated configuration, said latching surfaces engage each other in an interlocking relationship and retain said cap member and said base member in said mated configuration, said second latch post being configured such that, as said cap member and said base member are urged apart from said mated configuration, said second latch post structurally fails at said area of failure such that said latching surfaces disengage from each other and said cap member is removable from said base member.

13. The assembled circuit package of claim 12, wherein said assembled circuit package has a thermal bed supported within said base member, said thermal bed having first and second legs spaced from each other defining a slit for holding said optical integrated circuit;

thermally conductive means within said slit for holding said optical integrated circuit in suspension within said slit, and;

heater means for heating said thermal bed mounted on one of said legs.

14. A method for reworking an optical integrated circuit housed within an enclosure, comprising the steps of:

providing a housing having a base member and a cap member, the cap member being matable with the base member to form, in a mated configuration, a cavity therebetween, the base member having a first resilient post extending therefrom, the first resilient post having a first latching surface formed thereon, the cap member having a second resilient post extending therefrom, the second resilient post having a second latching surface formed thereon;

housing an optical integrated circuit within the cavity;

securing the base member and the cap member in the mating configuration by engaging the first and second latching surfaces with each other;

separating the cap member from the base member by causing structural failure of the second resilient post, and;

providing a replacement cap member and securing the replacement cap member to the base member in the mating configuration.

15. The method of claim 14, wherein the step of securing the base member and the cap member in the mating configuration comprises engaging the base member with the cap member such that the first and second resilient posts are biased from each other.

* * * * *